US006378004B1

(12) United States Patent
Galloway et al.

(10) Patent No.: US 6,378,004 B1
(45) Date of Patent: Apr. 23, 2002

(54) METHOD OF COMMUNICATING ASYNCHRONOUS ELEMENTS FROM A MINI-PORT DRIVER

(75) Inventors: Jeffery L. Galloway, The Woodlands; Mark I. Bain, Spring; John S. Lacombe, Tomball; Michael E. McGowen; Paul J. Muraski, both of Spring; Richard L. Purvis, Cypress; Robert E. Van Cleve, The Woodlands; Paul S. Bailey; Stephen D. Cochran, both of Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/074,110

(22) Filed: May 7, 1998

(51) Int. Cl.[7] ................................................ G06F 9/54
(52) U.S. Cl. ...................................... 709/321; 709/318
(58) Field of Search .................................. 709/310–400

(56) References Cited

U.S. PATENT DOCUMENTS

| 5,247,676 A | | 9/1993 | Ozur et al. .................. 395/650 |
| 5,307,490 A | * | 4/1994 | Davidson et al. ........... 709/304 |
| 5,430,876 A | | 7/1995 | Schreiber et al. ........... 395/650 |
| 5,491,800 A | | 2/1996 | Goldsmith et al. ......... 395/600 |
| 5,513,328 A | * | 4/1996 | Christofferson ............. 709/244 |
| 5,592,664 A | | 1/1997 | Starkey ....................... 395/600 |
| 5,640,556 A | | 6/1997 | Tamura ....................... 395/610 |
| 5,802,364 A | * | 9/1998 | Senator et al. .............. 709/301 |
| 5,832,513 A | * | 11/1998 | Kennedy .................... 707/202 |
| 5,978,815 A | * | 11/1999 | Cabrera et al. ............. 707/204 |
| 5,999,563 A | * | 12/1999 | Polley et al. ............... 375/222 |

OTHER PUBLICATIONS

Windows NT DDK, Kernel–Mode Guide, A 4.2.1 SCSI Miniport Driver's DriveEntry Routine © 1992–1996 Microsoft Corporation, pp. 1–14.

Win32 SDK:Win32, Reference, Functions, Visual C++ Books Online 4.2, "Microsoft RPC Model," © 1992–1995 Microsoft Corporation, pp. 1–6.

Win32 Driver Model for Windows Operating Systems, Technical Information for IHVs and OEMs, © 1995 Microsoft Corporation, pp. 1–6.

Moeller, Michael, "COM+ Services Add Up," PC Week, Apr. 13, 1998, vol. 15, No. 15, pp. 3 and 20.

Win32 Programmer's Reference, Visual C++ Books Online 4.2, "Multitasking," © 1992–1996 Microsoft Corporation, pp. 1–28.

Win32 SDK:RPC—Microsoft Developer Network Library, "RpcStringBindingCompose," © 1992–1995 Microsoft Corporation, pp. 1–2.

(List continued on next page.)

*Primary Examiner*—St. John Courtenay, III
*Assistant Examiner*—Van H. Nguyen
(74) *Attorney, Agent, or Firm*—Akin, Gump, Strauss, Hauer & Feld, LLP

(57) ABSTRACT

A computer system in accordance with the present invention provides a method of communicating asynchronous events from a mini-port driver of a computer system to a software component without polling the mini-port driver. The computer system provides a monolithic driver as a dispatch between a mini-port driver and a software component. Until an asynchronous event is detected, an event thread in the monolithic driver to a software component is blocked. When an asynchronous event is detected by the mini-port driver, the mini-port driver calls the monolithic driver with a monolithic driver entry point which queues the event and unblocks the event thread. The monolithic driver provides the asynchronous event to the software component through the unblocked event thread. The event thread is then re-blocked and remains blocked until another asynchronous event is detected. Asynchronous events are thereby communicated from a mini-port driver to a software component without polling the mini-port driver.

45 Claims, 15 Drawing Sheets

OTHER PUBLICATIONS

Win32 SDK:Win 32, Reference, Functions—Microsoft Developer Network Library, "CreateFile," © 1992–1995 Microsoft Corporation, pp. 1–7.

Win32 SDK:Win 32, Reference, Functions—Microsoft Developer Network Library, "CloseHandle," © 1992–1995 Microsoft Corporation, p. 1.

Win32 SDK:Win 32, Reference, Structures—Microsoft Developer Network Library, "SECURITY_ATTRIBUTES," © 1992–1995 Microsoft Corporation, p. 1.

Win32 SDK:Win 32, References, Structures—Microsoft Developer Network Library, "OVERLAPPED," © 1992–1995 Microsoft Corporation, p. 1.

Win32 SDK:Win32, Reference, Functions, Visual C++ Books Online 4.1, "DeviceIoControl," © 1992–1996 Microsoft Corporation, pp. 1–6.

Win32 SDK:Win32, RPC, Visual C++ Books Online 4.1, "RpcServerListen," © 1992–1996 Microsoft Corporation, pp. 1–2.

Win32 SDK:RPC, Visual C++Books Online 4.1, "RpcServerRegisterIf," © 1992–1996 Microsoft Corporation, pp. 1–6.

Win32 SDK:RPC, Visual C++Books Online 4.1. "RpcServerUseProtseqIf," © 1992–1996 Microsoft Corporation, pp. 1–2.

Win32 SDK:RPC—Microsoft Developer Network Library, "String Building," © 1992–1995 Microsoft Corporation, pp. 1–4.

Win32 SDK:Programmer's Reference—MSDN Library, "Anonymous Pipes," © 1992–1996 Microsoft Corporation, pp. 1–27.

CreateNamedPipe, Microsoft Corporation, pp. 1–3.

CreateEvent, Microsoft Corporation, pp. 1–2.

WaitForSingleObject, Microsoft Coroporation, pp. 1–2.

ReadFile, Microsoft Corporation, pp. 1–4.

CreateFile, Microsoft Corporation, pp. 1–6.

CreateThread, Microsoft Corporation, pp. 1–2.

Asche, Ruediger, "Windows NT Security in Theory and Practice," Technical Articles: Windows: Networking—Microsoft Developer Network Library, © 1992–1995 Microsoft Corporation, pp. 1–11.

Asche, Ruediger, "The Guts of Security," Technical Articles: Windows: Networking—Microsoft Developer Network Library, © 1992–1995 Microsoft Corporation, pp. 1–20.

Digital Equipment Corporation, "Digital Distributed Computing Environment (DEC) for Windows NT," ® 1994 Digital Equipment Corporation, pp. 1–10.

* cited by examiner

METHOD OF COMMUNICATING ASYNCHRONOUS ELEMENTS FROM A MINI-PORT DRIVER

CROSS-REFERENCE TO RELATED APPLICATIONS

Commonly-assigned U.S. patent application, Ser. No. 09/074,109 entitled "METHOD OF COMMUNICATING ASYNCHRONOUS EVENTS TO REMOTE PROCEDURE CALL CLIENTS" filed concurrently, is hereby incorporated by reference.

BACKGROUND OF THE INVENTION

1. Field of the Invention

The present invention relates to mini-port drivers of a computer system, and more particularly to a method of communicating asynchronous events from a mini-port driver of a computer system to a software component without polling the mini-port driver.

2. Description of the Related Art

Mini-port drivers such as a Windows NT® mini-port driver must be polled in order to communicate events detected by a mini-port driver to other software components of a computer system. A service, an example of a software component, typically polls a mini-port driver by calling a Device IoControl (Ioctl) function supported by the mini-port driver. In response to the Ioctl call, the mini-port driver provides event data in a thread to the service.

An Ioctl call to a mini-port driver may or may not be executed immediately in a thread of the mini-port driver. An Ioctl call to a mini-port driver may be executed immediately or may be executed after a delay. Further, a mini-port driver has not allowed an Ioctl calling thread in the mini-port driver to be blocked based on asynchronous events. Since a mini-port driver has not guaranteed that a process will be executed immediately or permitted selective blocking of an Ioctl calling thread based on asynchronous events, mini-port driver architecture has not allowed for communication of asynchronous events from a mini-port diver without polling the mini-port driver. Polling, being a repetitive process of calling a mini-port driver, has not depended upon immediate thread execution by a mini-port driver.

Polling a mini-port driver in order to keep event information detected by a mini-port driver current, however, has caused network traffic and system overhead. Polling also allows for event information detected by a mini-port driver to become stale for certain periods as event information detected by a mini-port driver is not updated until the mini-port driver is polled. Since a computer system may support a number of mini-port drivers, it has been necessary to poll each mini-port driver to update asynchronous event information detected by each mini-port driver. Increasing the poll frequency of mini-port drivers in an effort to maintain more current asynchronous event information undesirably increases network traffic.

SUMMARY OF THE INVENTION

Briefly, a computer system in accordance with the present invention provides a method of communicating asynchronous events from a mini-port driver to a software component without polling the mini-port driver. The computer system provides a monolithic driver as a dispatch between a mini-port driver and a software component of the computer system. Until an asynchronous event is detected, an event thread in the monolithic driver to a software component is blocked. When an asynchronous event is detected by the mini-port driver, the mini-port driver calls the monolithic driver which queues the event and unblocks the event thread. The monolithic driver provides the asynchronous event to the service through the unblocked event thread. The event thread is then blocked until another asynchronous event is detected. Asynchronous events are thereby communicated from a mini-port driver to a software component without polling the mini-port driver. Polling, however, may be performed in conjunction with this method.

In a disclosed embodiment in accordance with the present invention, the software component obtains a monolithic driver entry point from the monolithic driver. The software component then calls a mini-port driver to pass the monolithic driver entry point to the particular mini-port driver. When the mini-port driver has an event to report, the mini-port driver calls the monolithic driver entry point which queues the asynchronous event and unblocks the event thread in the monolithic driver so that the software component may receive the asynchronous event. By unblocking thread execution in a monolithic driver when an asynchronous event occurs, a mini-port driver is able to provide asynchronous event data to a software component.

DETAILED DESCRIPTION OF INVENTION

Figure 1:
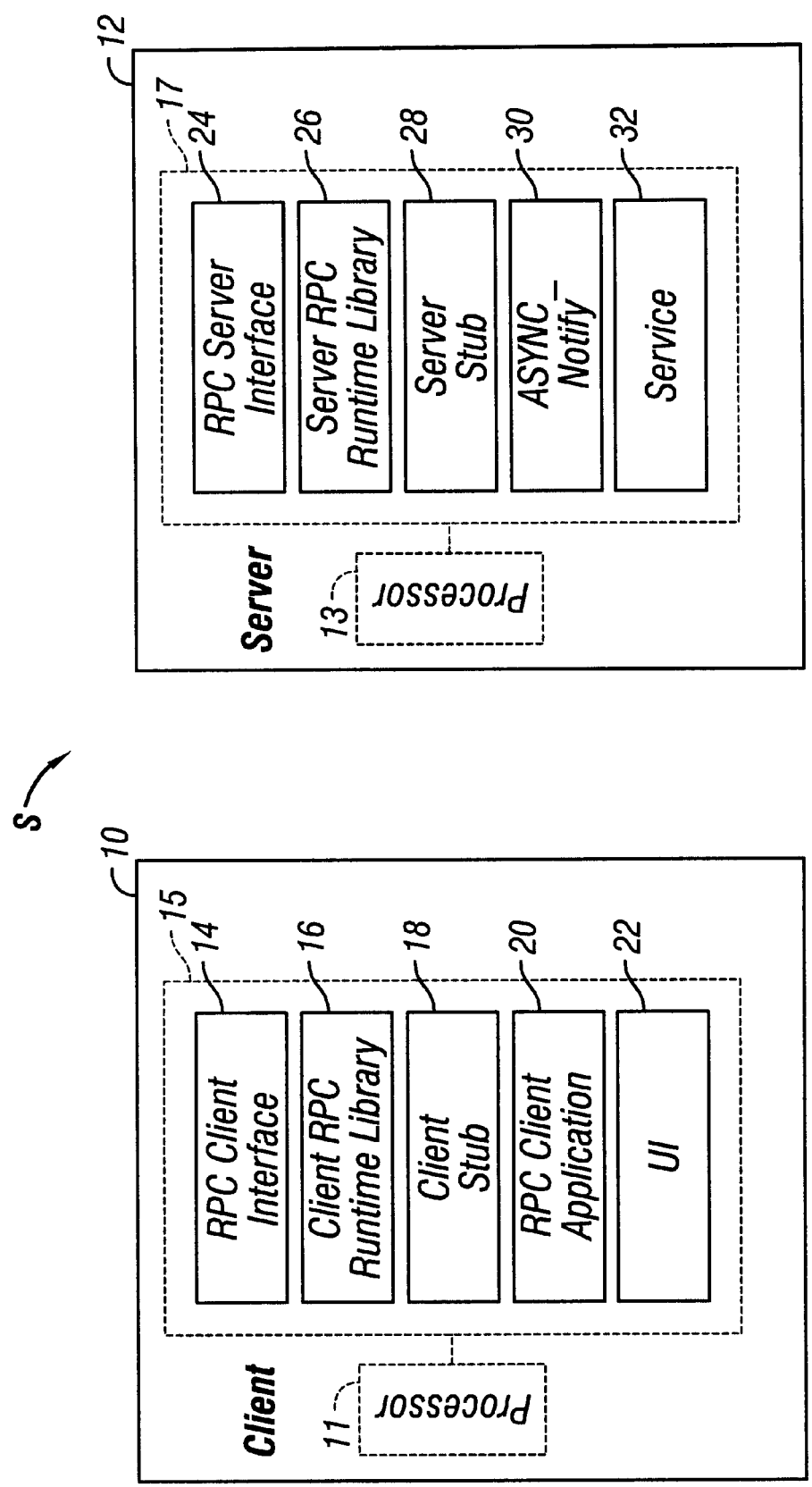
FIG. 1 is a schematic diagram of a remote procedure client and a server in accordance with the present invention.

Turning now to the drawings, FIG. 1 shows a schematic diagram of a remote procedure client 10 and a server 12 of a computer network system S. Both the client 10 and the server 12 include a multitasking operating system (not shown) that supports multiple threads of execution within a running process and a kernel for handling thread management. A process is a program that is loaded into memory and prepared for execution. A process may contain code, data, and other system resources—such as files, pipes, and synchronization objects—that are accessible to the threads of the process. Each process is started with a single thread. A thread is the basic entity to which the operating system allocates CPU time. A thread can execute any part of an application's code, including a part currently being executed by another thread. A multitasking operating system divides the available CPU time among the threads that need it. The operating system may utilize preemptive multitasking for allocating small slices of CPU time among the competing threads. Multitasking provides the ability to have several applications open and working at the same time. A further advantage of multitasking is the ability to create applications that use more than one process and to create processes that use more than one thread of execution.

The client 10 includes a processor 11 coupled to a processor readable medium 15 containing RPC client interface 14, a client RPC runtime library 16, a client stub 18, a RPC client application 20, and a user interface (UI) 22. The RPC client application 20 uses function calls to the client RPC runtime library 16 to access RPC client stub code 18 through the RPC client interface 14. The client stub 18 marshals arguments and calls a communication subsystem (not shown) to send the arguments to the server 12. Marshalling is essentially the process of packaging arguments or parameters into a network message. The kernel of the client 10 sends the network message to the server 12. A function call to the RPC client application 20 may be initiated by a user command from the user interface 22. A remote procedure call (RPC) permits individual procedures of an application to run on systems anywhere on a network. The client 10 permits remote communication over a network to the server 12, and the server 12 permits remote communication over the network to the client 10. It should be understood that the network computer system S may include a plurality of remote procedure clients capable of remote communication to the server 12.

In accordance with the present invention, the server 12 includes a processor 13 coupled to a processor readable medium 17 containing an RPC server interface 24, a server RPC runtime library 26, server stub 28, an ASYNC_NOTIFY block 30, and a service 32. A service is essentially a software construct that provides software code to supplement the functions of an operating system. The service 32 supports RPC interface calls, service calls, device class DLL calls, client library calls, and driver calls. The RPC interface calls, service calls, device class DLL calls, and client library calls, are of a conventional type, such as those defined by Windows NT®. Certain RPC interface calls, for example, are documented in MS WIN32 RPC Programmers' Guide and Reference, which is incorporated herein by reference. Examples of service calls which may be supported by the service 32 may include messages for informing the service 32 to stop, pause, resume, or report its status. It should be understood that the processor readable medium 15 of the client 10 and the processor readable medium 17 of the server 12 may be any medium suitable for storing code to be executed by a processor, such as a compact disc read only memory (CD-ROM), a disk, or a memory device, for example.

Incoming calls to a server 12 are directed to the RPC server interface 24. The RPC server interface 24 defines a number of procedures which may be called remotely by the client 10. A remote procedure call is passed through the RPC server interface 24 to the server stub code 28. The server stub code 28 marshals arguments from the network message. The server stub code 28 also translates the input arguments from network to local data representation and passes the arguments directly on to the called remote procedure. The procedure then executes and returns any results to the server stub code 28. The server stub code 28 translates the results and passes them to the server RPC run time library 26. The server RPC runtime library 26 dispatches the results over the network to the client RPC runtime library 16. In accordance with the present invention, the server 12 further includes an ASYNC_NOTIFY block 30 for communicating asynchronous events from the server 12 to client 10. It should be understood that the software of the present invention may be stored in a processor readable medium external to the server 12 or client 10 and then provided to the processor readable medium 15 or 17 internal to the client or server.

ASYNCHRONOUS COMMUNICATION BETWEEN A CLIENT AND SERVER

Figure 2:
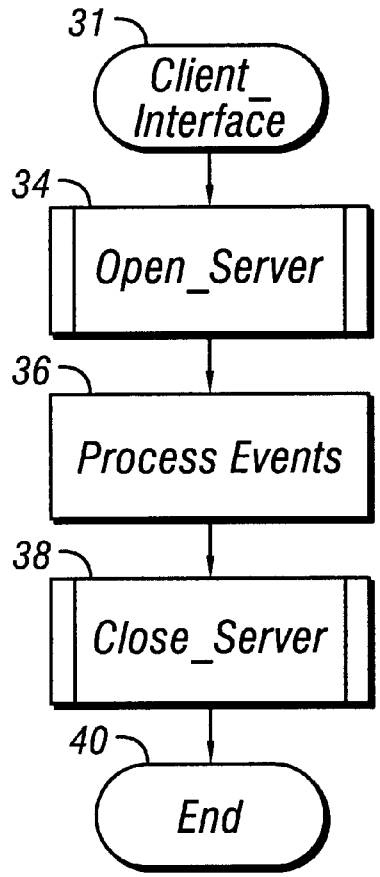
FIG. 2 is a flow chart of a CLIENT_INTERFACE routine in accordance with the present invention.
Figure 3:
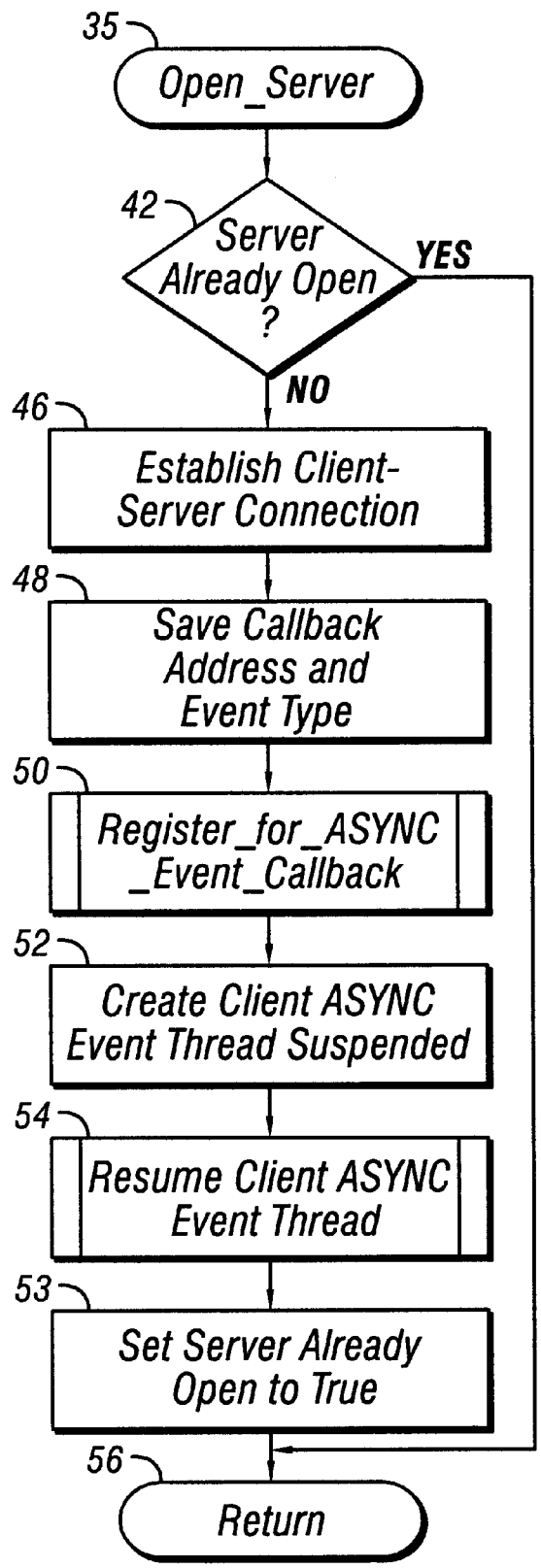
FIG. 3 is a flow chart of an OPEN_SERVER routine of FIG. 2 in accordance with the present invention.

Referring to FIG. 2, a flow chart of a CLIENT_INTERFACE routine 31 for the client 10 is shown. Beginning at step 34, an OPEN_SERVER routine 35 is called. Referring to FIG. 3, the OPEN_SERVER routine 35 is shown. In the disclosed embodiment, the OPEN_SERVER routine 35 is a function having an input parameter, Server. The Server parameter is a null terminated string containing the name of a server such as 12. If the function succeeds in binding to a server, the return value is ERROR_SUCCESS. If the function fails to bind, the return value is FALSE. Beginning at step 42, it is determined whether the server 12 is already open. A determination of whether the server 12 is already open may be made by determining the state of a SERVER_ALREADY_OPEN variable. If SERVER_ALREADY_OPEN is TRUE, then the server 12 is open, and if SERVER_ALREADY_OPEN is FALSE, then the server 12 is not open. If the server 12 is already open, control returns through step 56. If the server 12 is not already open, control proceeds to step 46 where a client-server connection is established. In the disclosed embodiment, a client-server connection is established by a remote procedure call from the client 10 to the server 12 which returns a ClientID parameter. When a connection is made between the server 12 and the client 10, a binding handle for the particular client 10 is returned. The binding handle is implicitly used until the connection between the server 12 and the client 10 is closed. Various string binding APIs (application programming interfaces) may be used for establishing or terminating a client-server connection. Examples of string binding APIs are provided in the table below:

| STRING BINDING FUNCTIONS | DESCRIPTION |
| --- | --- |
| RPCStringBindingCompose | Combine components of a string binding into a string binding |
| RPCBindingFromStringBinding | Convert string binding to binding handle |
| RPCBindingSetAuthInfo | Set security for string binding |
| RPCStringFree | Deallocate memory for the string returned in the String Binding argument |
| RPCBindingFree | Release binding |

Figure 4:
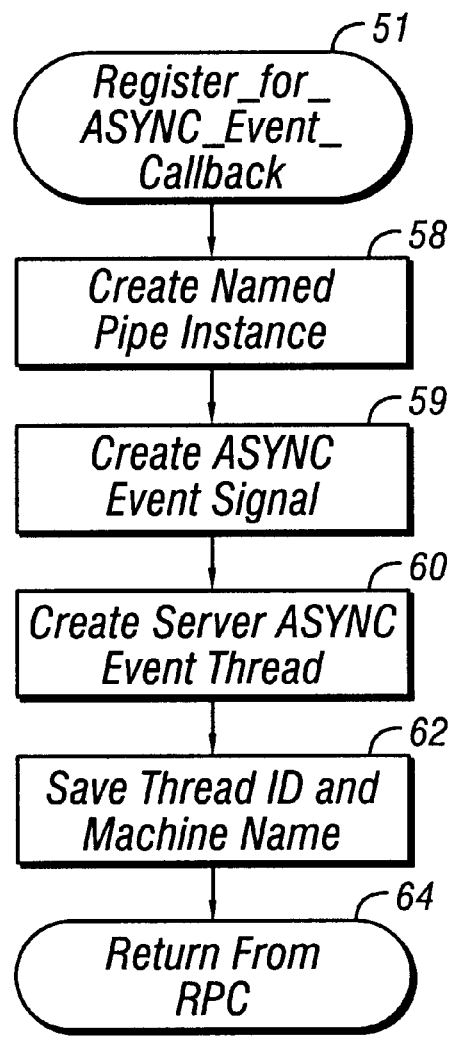
FIG. 4 is a flow chart of a REGISTER_FOR_ASYNC_CALLBACK routine of FIG. 3 in accordance with the present invention.

Next, control proceeds to step 48 where a callback address for the client 10 and an event type are saved. The saved event type indicates the type of events to be provided to the client 10. An event mask is defined for the client 10 to mask out activities and events which are not of interest to the client 10. In the disclosed embodiment, a callback address for the client 10 is stored as a callback entry in a callback table. From step 48, control proceeds to step 50 where a REGISTER_FOR_ASYNC_EVENT_CALLBACK routine 51 is called. Referring to FIG. 4, the REGISTER_FOR_ASYNC_EVENT CALLBACK routine 51 is shown. In the disclosed embodiment, the REGISTER_FOR_ASYNC_EVENT_CALLBACK routine 51 is a remote procedure call. The routine 51 is also a function having an input parameter, ClientID. The ClientID parameter represents the ID of the client 10 to register which was returned when the client server connection was established. If the function is successful, the return value is 0. If the function fails, the return value is an error code.

Beginning at step 58, a named pipe instance is created. A pipe is a communication conduit, which in this case is between the server 12 and the client 10. In the disclosed embodiment, a named pipe instance is created by calling the CreateNamedPipe function. The data passed to the CreateNamedPipe function is defined below:

```
HANDLE CreateNamedPipe (
    LPCTSTR lpName,
    DWORD dwOpenMode,
    DWORD dwPipeMode,
    DWORD nMaxInstances,
    DWORD nOutBufferSize,
    DWORD nInBufferSize,
    DWORD nDefaultTimeOut,
    LPSECURITY_ATTRIBUTES lpSecurityAttributes
    );
```

The lpName is a pointer to the pipe name. dwOpenMode is a parameter specifying the pipe access mode. dwOpenMode is set to PIPE_ACCESS_DUPLEX and FILE_FLAG_WRITE_THROUGH. The PIPE_ACCESS_DUPLEX mode causes the pipe to be bidirectional, such that both the client 10 and the server 12 can read from and write to the named pipe. The FILE_FLAG_WRITE_THROUGH mode causes functions writing to the named pipe to not return until data written is across the network. dwPipeMode specifies the type, read, and wait modes of the pipe handle. dwPipeMode is set to PIPE_TYPE_MESSAGE, PIPE_READMODE_MESSAGE, and PIPE_WAIT. In a PIPE_TYPE_MESSAGE mode, data is written to the pipe as a stream of messages. In a PIPE_READMODE_MESSAGE mode, data is read from a pipe as a stream of messages. In a PIPE_WAIT mode, blocking of a pipe is enabled. nMaxInstances specifies the maximum number of instances that can be created for a pipe. nOutBufferSize specifies the number of bytes to reserve for the output buffer. The nInBuffer Size parameter specifies the number of bytes to reserve for the input buffer. The nDefaultTimeOut parameter specifies the default time-out value in milliseconds. The lpSecurityAttributes parameter specifies a pointer to a SECURITY ATTRIBUTES structure for determining whether child processes can inherit the returned handle. If the CreateNamedPipe function succeeds, the return value is a handle to the server end of a named pipe instance. If the function fails, the return handle is INVALID_HANDLE_VALUE. A named pipe is one type of guaranteed delivery communication conduit since either end of a pipe can determine if the other end received an event or failed to receive an event. While the disclosed embodiment is illustrative of pipe-based communication, it should be understood that other implementations providing guaranteed delivery communication are also possible, such as socket-based communication for example.

Control continues from step 58 to step 59 where an async event signal is created. The async event signal when provided indicates that an asynchronous event is present in the server asynchronous event queue 153 (FIGS. 11B–11F). The server asynchronous event queue 153 is a queue in the server 12 for storing asynchronous events. The server 12 contains a server asynchronous event queue 153 for each client 10 of the plurality of clients. From the server asynchronous event queue 153, an event is transmitted across a named pipe to a respective client 10. Control next proceeds to step 60 where a CreateThread function is called to create a SERVER_ASYNC_EVENT_THREAD routine 61. The date passed to the CreateThread function is defined below:

```
HANDLE CreateThread (
    LPSECURITY_ATTRIBUTES lpThreadAttributes
    DWORD dwStackSize,
    LPTHREAD_START_ROUTINE lpStartAddress
    LPVOID lpParameter,
    DWORD dwCreationFlags,
    LPWORD lpThreadLD
    );
```

The lpThreadAttributes parameter is a pointer to a SECURITY ATTRIBUTES structure that determines whether the return handle can be inherited by a child process. The dwStackSize parameter specifies the initial thread stack size in bytes. The lpStartAddress parameter points to the application-supplied function to be executed by the thread and represents the starting address of the thread. The lpParameter parameter specifies a single 32-bit parameter value for an argument for the new thread. The dwCreationFlags parameter specifies the flags that control creation of the thread. In accordance with the present invention, dwCreationFlags is set to the CREATE_SUSPENDED flag. The CREATE_SUSPENDED flag causes the created thread to be in a suspended state. A ResumeThread function is necessary to return a thread from a suspended mode. Operation of the ResumeThread function is understood to one of ordinary skill in the art. The lpThreadId parameter points to a 32-bit variable that receives the thread identifier. If the CreateThread function succeeds, the returned value is a handle to a new thread. If the function fails, the return value is NULL. The SERVER_ASYNC_EVENT_THREAD routine 61 may execute independently at any time after a CreateThread call. It should be understood that the SERVER_ASYNC_EVENT_THREAD routine 61 creates an event thread for any client which calls REGISTER_FOR_ASYNC_EVENT_CALLBACK routine 51.

Figure 5:
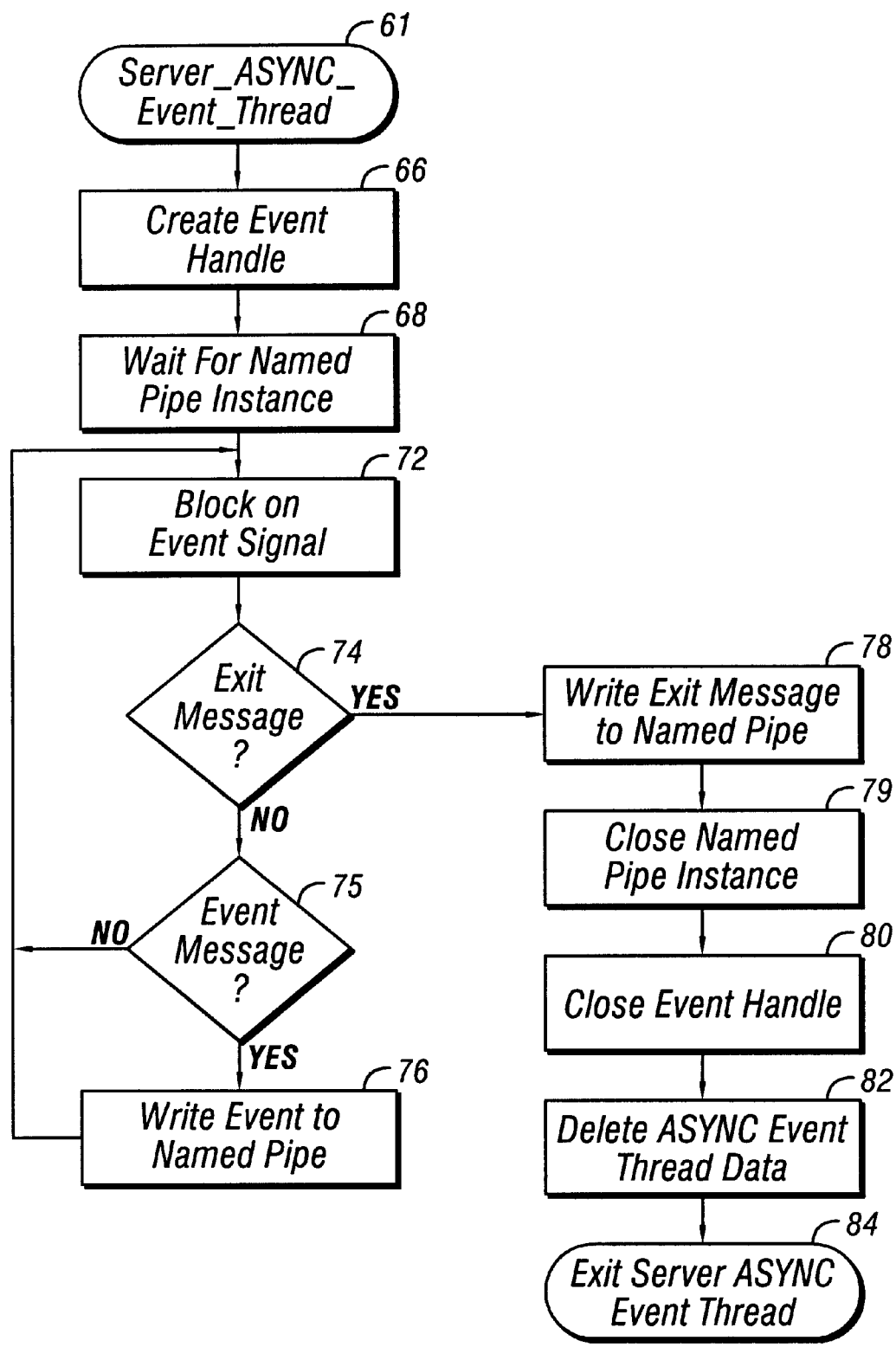
FIG. 5 is a flow chart of a SERVER_ASYNC_EVENT_THREAD routine of FIG. 4 in accordance with the present invention.

Referring to FIG. 5, the SERVER_ASYNC_EVENT_THREAD routine 61 is shown. The SERVER_ASYNC_EVENT THREAD routine 61 is a thread function with an input parameter, ThreadData. The ThreadData parameter is a pointer to data that will be associated with a thread. If the function is successful, the return value is 0. If the function fails, the return value is an error code. Beginning at step 66, an event handle is created. In the disclosed embodiment, the event handle is created by calling a CreateEvent function. The data passed to the CreateEvent function is defined below:

```
HANDLE CreateEvent (
    LPSECURITY_ATTRIBUTES lpEventAttributes,
    BOOL bManualReset
    BOOL bInitialState
    BOOL lpName
);
```

The parameter lpEventAttributes is a pointer to a SECURITY_ATTRIBUTES structure that defines whether the returned handle can be inherited by a child process. The lpEvenAttributes parameter is set to NULL. The bManualReset parameter specifies whether a manual-reset or auto-reset event object is created. The bManualReset parameter is set to TRUE, therefore the ResetEvent function must be used to manually reset a state to non-signalled. The bInitialState parameter specifies an initial state of an event object. The bInitialState parameter is set to FALSE, therefore the initial state is non-signaled. The lpName parameter points to the event object name. The lpName parameter is set to NULL, causing the event object to be created without a name. If the CreateEvent function succeeds, the return value is a handle to the event object.

Control next proceeds to step 68 where the SERVER_ASYNC_EVENT_THREAD routine 61 waits for the named pipe instance to connect. Next, in step 72, a block is placed on the async event signal. A block on the async event signal places the SERVER_ASYNC_EVENT_THREAD routine 61 in a sleep or suspend state. The SERVER_ASYNC_EVENT_THREAD routine 61 remains in a suspend state until the SERVER_ASYNC_EVENT_THREAD routine 61 receives either an event message or an exit message from the client 10. In step 74, it is determined whether the SERVER_ASYNC_EVENT_THREAD routine 61 has received an exit message. If the SERVER_ASYNC_EVENT_THREAD 61 has received an exit message, control proceeds to step 78 where the exit message is written to the named pipe. In the disclosed embodiment, data is written to a pipe by calling a WriteFile function. The data passed to the WriteFile function is defined below:

```
BOOL WriteFile (
    HANDLE hfile,
    LPVOID lpBuffer,
    DWORD nNumberOfBytesToRead
    LPWORD lpNumberOfBytesToRead,
    LPOVERLAPPED lpOverlapped
);
```

The hfile parameter identifies the pipe to be written. The lpBuffer parameter points to a buffer containing the data to be written to the pipe. The lpBuffer parameter is set to the variable TRANSMSG representing a message to be transmitted. The nNumberOfBytesToWrite parameter is the number of bytes to be written. The lpNumberOfBytesWritten points to the number of bytes actually written, filled by the WriteFile call. The lpOverlapped parameter points to the OVERLAPPED structure, which is set to NULL.

From step 78, control proceeds to step 79 where the named pipe instance is closed. In the disclosed embodiment, the named pipe instance is closed by calling a CloseHandle function known in the art. Next, at step 80 the event handle is closed. In the disclosed embodiment, an event handle is closed by calling the CloseHandle function. Next, control proceeds to step 82 where the asynchronous event thread data is deleted. From step 82, control proceeds to step 84 where the SERVER_ASYNC_EVENT_THREAD routine 61 is exited.

In step 74, if the SERVER_ASYNC_EVENT_THREAD routine 61 does not detect an exit message, then control proceeds to step 75 where it is determined if an event signal is provided. If an event message is provided to the SERVER_ASYNC_EVENT_THREAD routine 61, then control proceeds to step 76 where the event message is written to the named pipe. In the disclosed embodiment, an event message is written to the named pipe by calling the WriteFile function described above. If an event message is not available, control proceeds from step 75 back to step 74. The SERVER_ASYNC_EVENT_THREAD routine 61 thus remains in a blocked state until an event message or exit message is received. Returning to FIG. 4, control continues from step 60 to step 62 where a thread ID machine name is saved. From step 62, control returns from the REGISTER_FOR_ASYNC_EVENT_CALLBACK remote procedure call 51 through step 64. Returning to FIG. 3, from step 50, control proceeds to step 52 where a client asynchronous event thread 150 (FIGS. 11C–11H) is created. In the disclosed embodiment, a CreateThread function is used to create the client asynchronous event thread 150 in a suspended state. The data passed to the CreateThread function is defined above.

Figure 6:
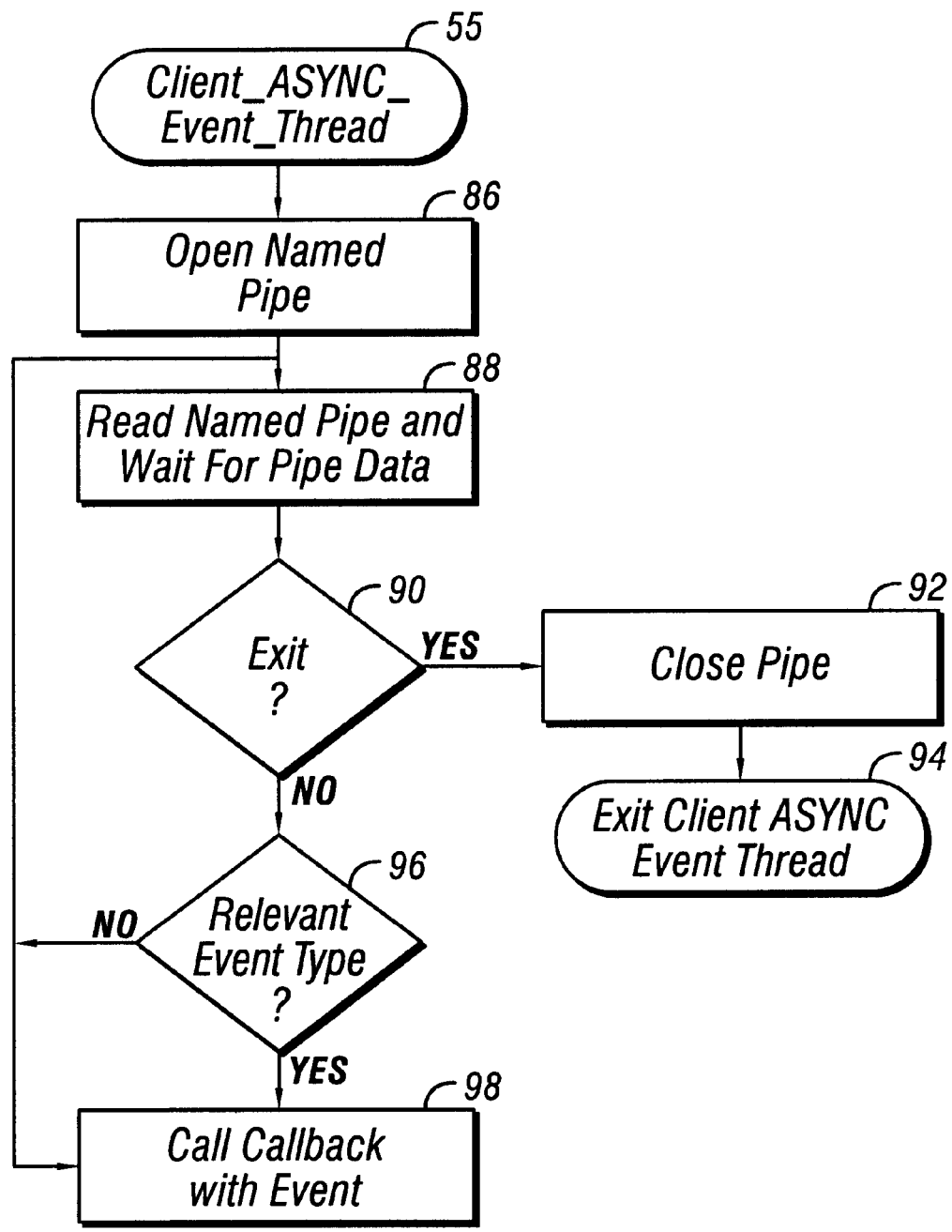
FIG. 6 is a flow chart of a CLIENT_ASYNC_EVENT_THREAD of FIG. 3 in accordance with the present invention.

From step 52, control proceeds to step 54 where the client asynchronous event thread 150 is resumed. The client asynchronous event thread 150 is resumed from its initially suspended state by a call to the ResumeThread function, and the CLIENT_ASYNC_EVENT_THREAD thread function 55 begins (FIG. 6). Beginning at step 86, a named pipe is opened. The pipe name is based on the client ID and is the client end of the named pipe that was created in the server by the REGISTER_FOR_ASYNC_EVENT_CALLBACK routine 51. In the disclosed embodiment, the named pipe is opened by calling a CreateFile function. The data passed to the CreateFile function is defined below:

```
HANDLE CreateFile (
    LPCTSTR lpFileName,
    DWORD dwDesiredAccess,
    DWORD dwShareMode,
    LPSECURITY_ATTRIBUTES lpSecurityAttributes,
    DWORD dwCreationDistribution,
    DWORD dwFlagsAndAttributes,
    HANDLE hTemplateFile,
);
```

The lpFileName parameter is a pointer to the name of the pipe. The dwDesiredAccess parameter is an access mode for the pipe. The dwDesiredAccess parameter is set to GENERIC_READ/GENERIC_WRITE. The dwShare- Mode parameter is a set of bit flags that specify the file can be shared. The dwShareMode is set to zero indicating the pipe cannot be shared. The lpSecurityAttributes parameter is a pointer to a SecurityAttributes structure that determines whether the returned handle can be inherited by a child process. The lpSecurityAttributes parameter is set to NULL so the handle cannot be inherited. The dwCreationDistribution parameter specifies which action to take on existing pipes. The dwCreationDistribution is set to OPEN_EXISTING, specifying an open file operation. The dwFlagsAndAttributes parameter specifies the file attributes and flags for the created file. The dwFlagsAndAttributes parameter is set to FILE_ATTRIBUTE_NORMAL, meaning the pipe has no attributes set. The hTemplateFile parameter specifies a handle with GENERIC_READ access to a template file. The hTemplateFile paramater is set to NULL.

From step 86, control proceeds to step 88 where the named pipe is read and the thread waits for pipe message data. Next, in step 90, it is determined whether an exit message was read from the named pipe. If an exit message was read, control proceeds to step 92 where the named pipe is closed. From step 92, the client asynchronous event thread exits through step 94. If the message read from the named pipe is not an exit message, control proceeds from step 90 to step 96. In step 96, it is determined whether the event message from the named pipe is a relevant event message type to the particular client 10. If the event message is a relevant event message type, then control proceeds to step 98 where the client 10 is called with a callback address (for a callback routine) and the event message. From step 98, control loops back to step 88 where the named pipe is again read. If the event message from the named pipe is not of a relevant event type to the particular client 10, then control loops from step 96 back to step 88.

Figures 7, 8:
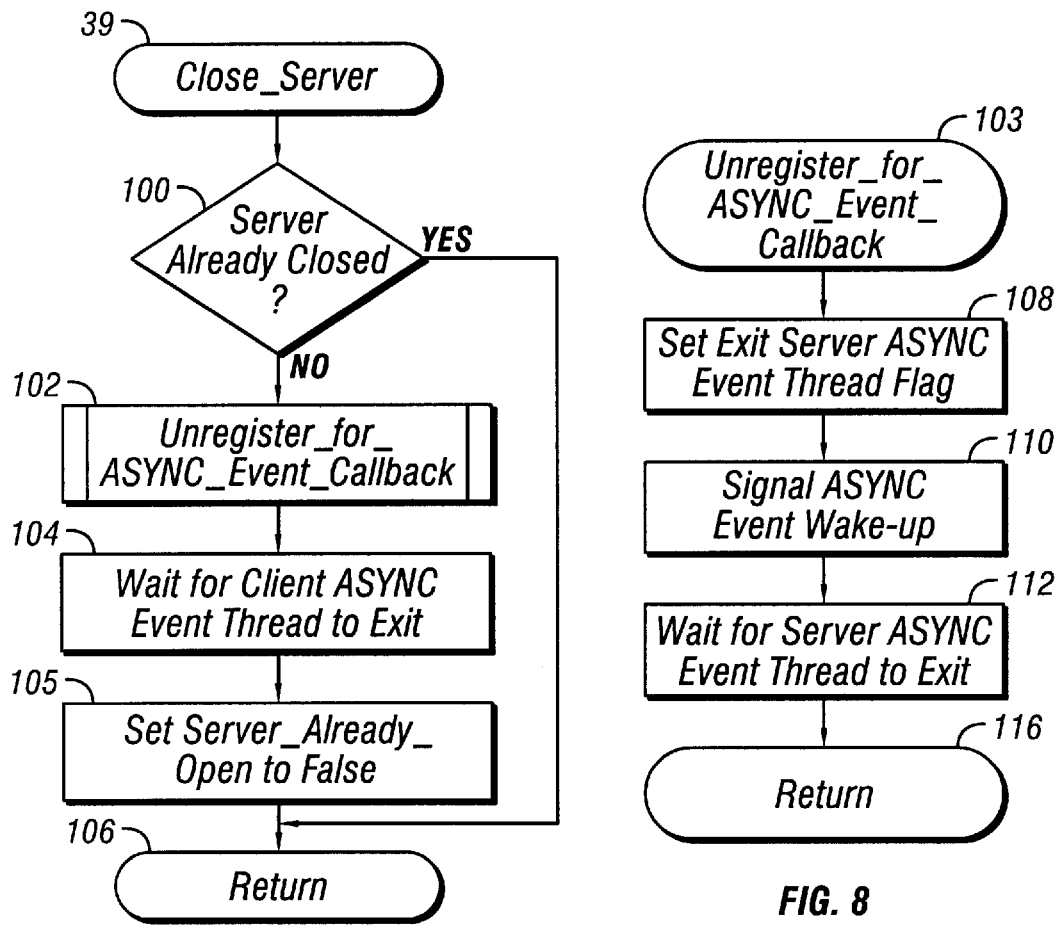
FIG. 7 is a flow chart of a CLOSE_SERVER routine of FIG. 2 in accordance with the present invention.
FIG. 8 is a flow chart of an UNREGISTER_FOR_ASYNC_CALLBACK routine of FIG. 7 in accordance with the present invention.

From step 54, control proceeds to step 53 where the SERVER_ALREADY_OPEN variable is set to TRUE. Next, control returns through step 56. Returning to FIG. 2, from step 34, control proceeds to step 36 where asynchronous events are processed. Calling a callback routine in the client 10 in step 98 activates the processing of events. Next, control proceeds to step 38 where the CLOSE_SERVER routine 39 is called. Referring to FIG. 7, the CLOSE_SERVER routine 39 is shown. In the disclosed embodiment, the CLOSE_SERVER routine 39 is a function having no input parameters. If the function is successful, the return value is TRUE. If there is an error when unregistering the client 10, waiting for the thread to exit, or releasing a binding, the return value is FALSE. Beginning at step 100, it is determined whether the server 12 is already closed by determining the state of the SERVER_ALREADY_OPEN variable. If the server 12 is already closed, control returns through step 106. If the server 12 is not already closed, control proceeds to step 102 wherein the remote procedure call UNREGISTER_FOR_ASYNC_EVENT_CALLBACK 103 is called. Referring to FIG. 8, the UNREGISTER_FOR_ASYNC_EVENT_CALLBACK remote procedure call 103 is shown. In the disclosed embodiment, the UNREGISTER_FOR_ASYNC_EVENT_CALLBACK routine 103 is a function with an input parameter, ClientID. Client ID refers to the ID of the client 12 to unregister that was obtained in OPEN_SERVER 35. If the function is successful, the return value is 0. If the function fails, the return value is an error code. Control begins at step 108 where an exit server async event thread flag is set. From step 108, control proceeds to step 110 where an async event wakeup signal is generated.

Control then proceeds to step 112 where the process waits for the SERVER_ASYNC_EVENT_THREAD routine 61 to exit. In the disclosed embodiment, a WaitForSingleObject function is called to cause a wait for the particular thread to exit. The data passed to the WaitForSingleObject function is defined below:

```
DWORD WaitForSingleObject (
    HANDLE hHandle,
    DWORD dwMilliseconds
);
```

The hHandle parameter identifies the particular object. The dwMilliseconds parameter specifies the time-out period in milliseconds. The WaitForSingleObject function returns when either a specified object is in the signaled state or the time-out interval elapses. The WaitForSingleObject function returns when the thread handle is signaled (thread exited) or when the time-out expires.

Next, Control returns from the UNREGISTER_FOR_ASYNC_EVENT_CALLBACK remote procedure call 103 through step 116. Referring to FIG. 7, control proceeds from step 102 to step 104 where a wait for the client asynchronous event thread to exit is generated. In the disclosed embodiment, the wait is performed by calling the WaitForSingleObject function described above. From step 104, control proceeds to step 105 where the SERVER_ALREADY_OPEN variable is set to FALSE. Next, the CLOSE_SERVER routine 39 returns through step 106. Referring to FIG. 2, from step 38, the CLIENT_INTERFACE routine 31 terminates through step 40.

Figure 9:
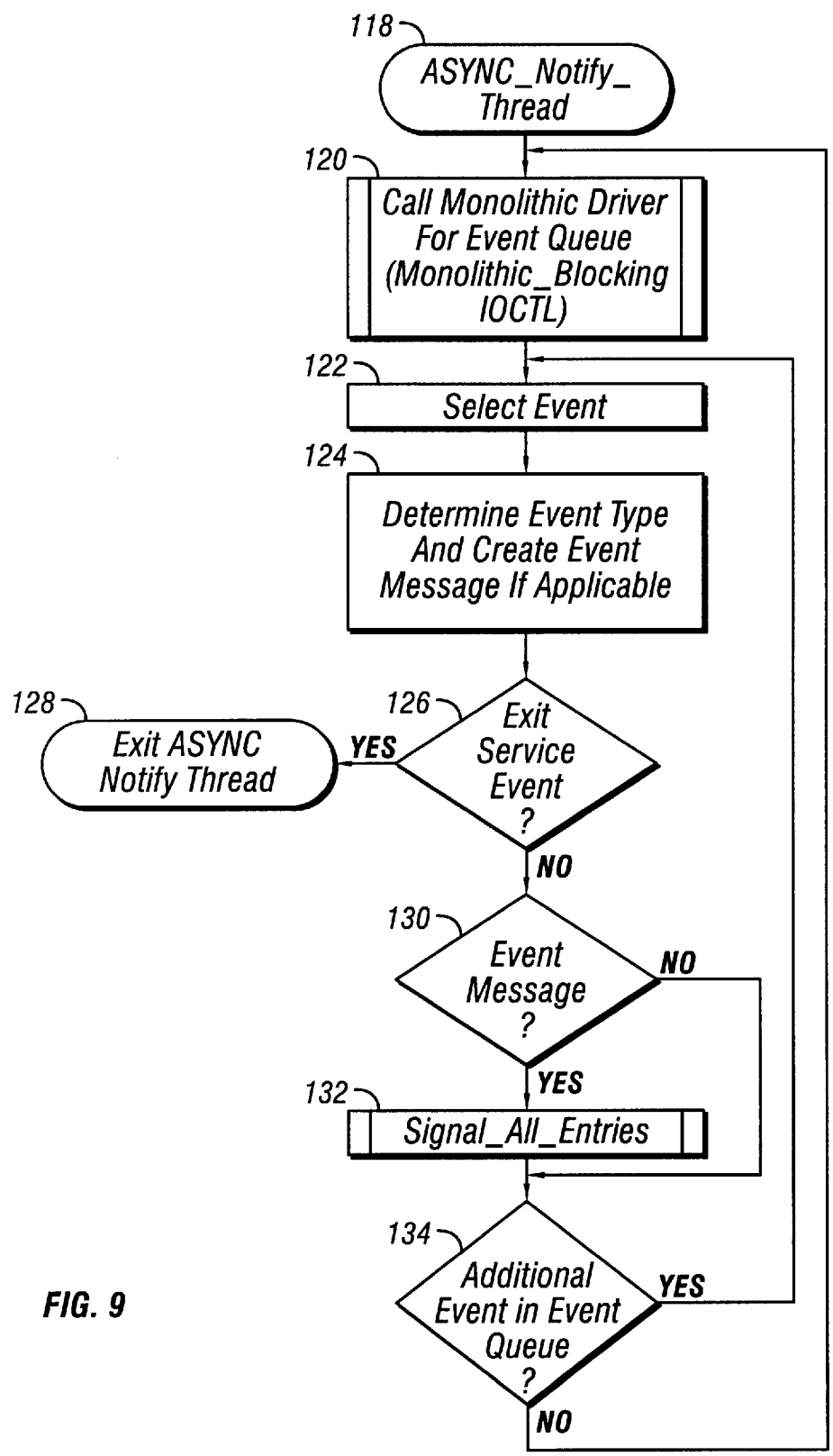
FIG. 9 is a flow chart of an ASYNC_NOTIFY_THREAD routine in accordance with the present invention.

Referring to FIG. 9, an ASYNC_NOTIFY_THREAD routine 118 provided by the ASYNC_NOTIFY block 30 is shown. The ASYNC_NOTIFY_THREAD routine 118 represents an asynchronous event notification thread for generating and sending asynchronous event messages from the server 12 to the client 10. Beginning in step 120, the routine 118 calls a monolithic driver 204 (FIG. 12) for an event queue 206 using the IOCTL 212 in FIG. 16 which is described below. In the disclosed embodiment, step 120 is performed using an IOCTL. An IOCTL is a generic driver call interface such as the Win32 DeviceIoControl API function. The parameter types, input parameters, and description of the input parameters for the Win32 DeviceIoControl API function are given below:

| PARAMETER TYPES | INPUT PARAMETERS | DESCRIPTION |
| --- | --- | --- |
| HANDLE | HDevice; | handle ofdevice |
| ULONG | UIIoControlCode; | control code of operation not perform |
| LPVOID | lpvInBuffer; | address of buffer for input data |
| ULONG | IcbInBuffer; | size of input buffer |
| LPVOID | lpvOutBuffer; | address of output buffer |
| ULONG | IcbOutBuffer; | size of output buffer |
| LPULONG | lpcbBytesReturned; | address of actual bytes of output |
| LPOVERLAPPED | lpoOverlapped; | address of overlapped structure |

Here, the hDevice parameter is set to the handle of a monolithic driver 204 and the lpvOutBuffer parameter is set to the address of an event queue 206 in the monolithic driver 204. From step 120, control proceeds to step 122 where an event is selected. Next, in step 124, the event type of the event is determined and an event message is created, if applicable. In step 126, it is specifically determined whether the event is an exit service event. If the event is an exit service event, then the asynchronous event notification thread exits through step 128. If the event selected is not an exit service event, control proceeds to step 130. In step 130, it is detected if an event message or set of event messages to the client 10 is needed. If an event message is needed, control proceeds to step 132 where a SIGNAL_ALL_ENTRIES routine 133 is called to distribute an event message or set of event messages to all client threads. Each client thread transmits the message to its respective client through the named pipe.

Figure 10:
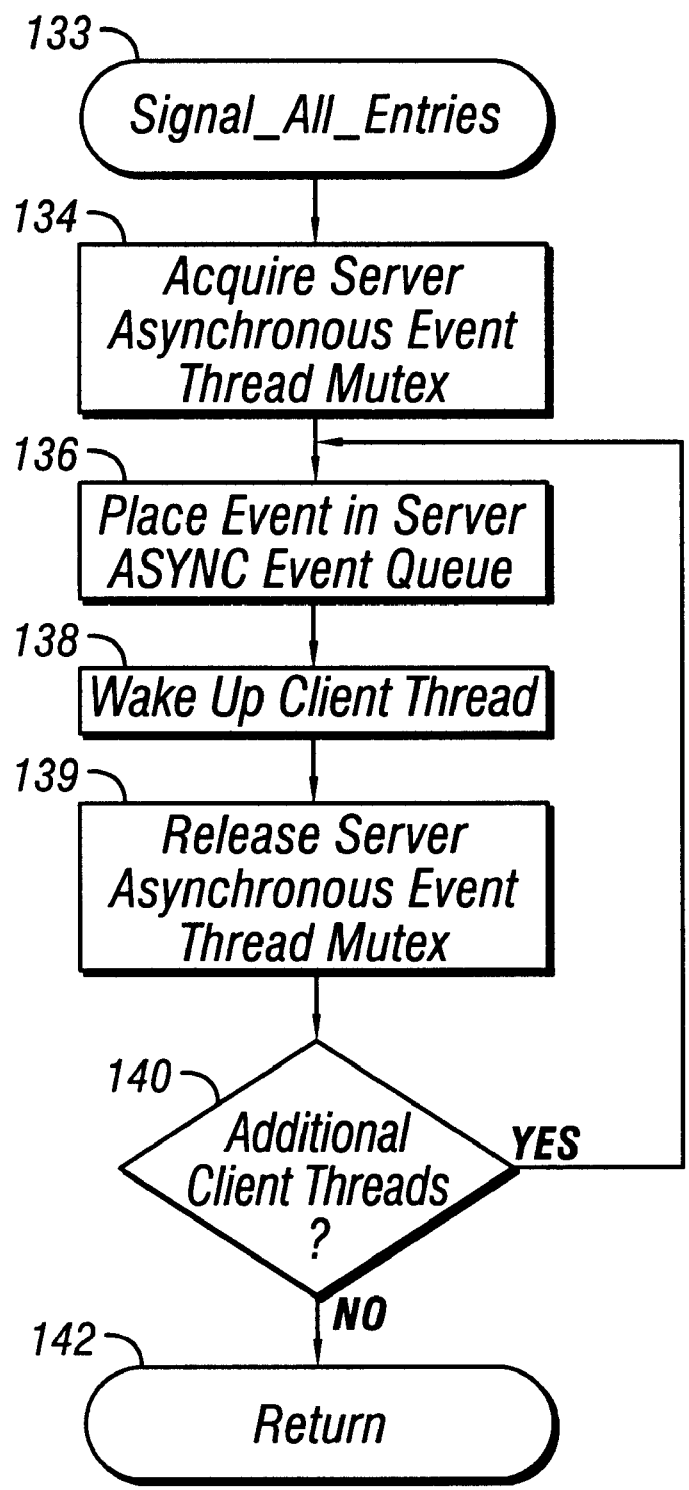
FIG. 10 is a flow chart of a SIGNAL_ALL_ENTRIES routine of FIG. 9 in accordance with the present invention.

Referring to FIG. 10, the SIGNAL_ALL_ENTRIES routine 133 is shown. Beginning at step 134, a server asynchronous event thread mutex (mutually exclusive) is acquired by SIGNAL_ALL_ENTRIES 133 in order to add data to the server asynchronous event queue 153. At step 136, the event message is placed in the server asynchronous event queue 153. Control then proceeds to step 138 where the server asynchronous event thread is awakened by an event message. Next, in step 139, the server asynchronous event thread mutex is released. From step 139, control proceeds to step 140 where it is determined whether there are additional client asynchronous event threads. If there are other client asynchronous event threads, control proceeds back to step 136. If there are no other client asynchronous event threads, control returns to step 142.

Returning to FIG. 9, control proceeds from step 132 to step 134. At step 134, it is determined whether an additional event is in the event queue 206. If an additional event is not in the event queue 206, control returns to step 120 where the monolithic driver 204 is again called for the event queue 206. If an additional event is in the event queue 206, control proceeds back to step 122 where another event is selected from the event queue 206.

Asynchronous Event Messaging Process

Figure 11A:
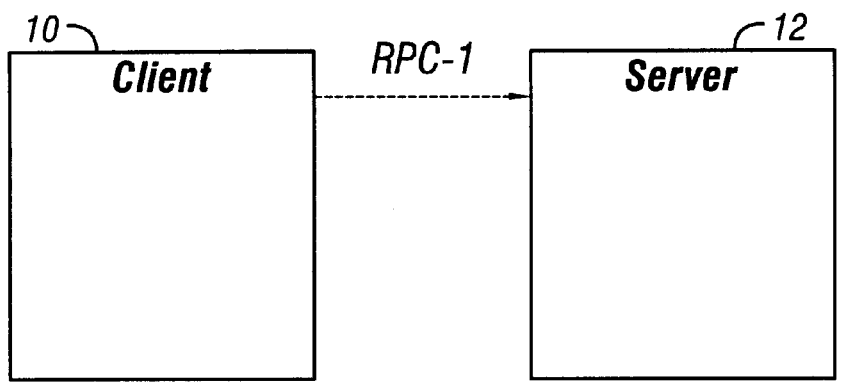
FIGS. 11A–11I are schematic illustrations of an asynchronous event messaging process between a remote procedure client and a server in accordance with the present invention.
Figure 11B:
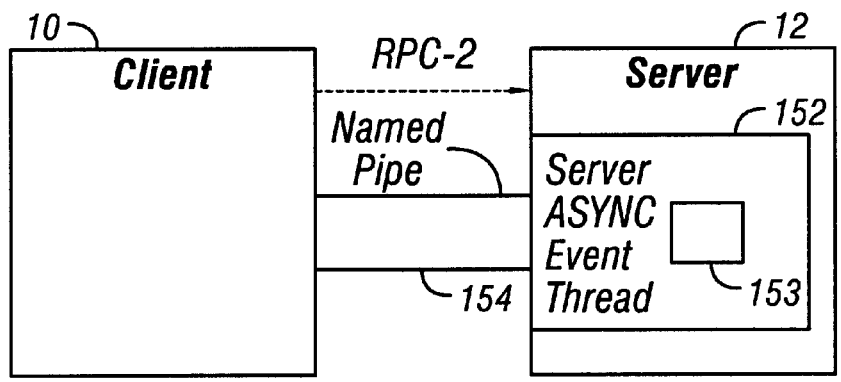
Figure 11C:
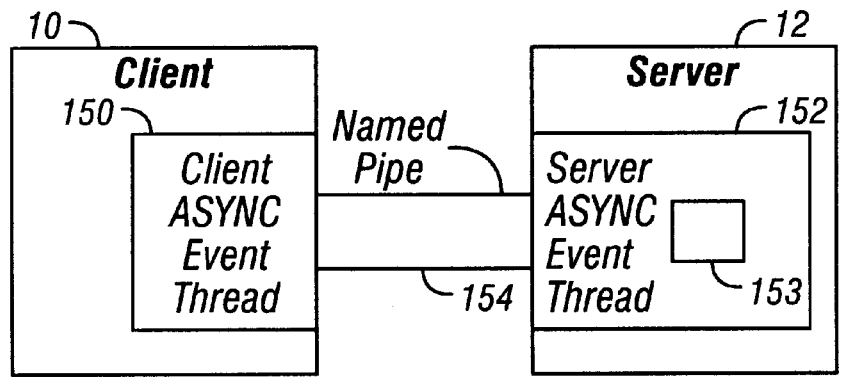
Figure 11D:
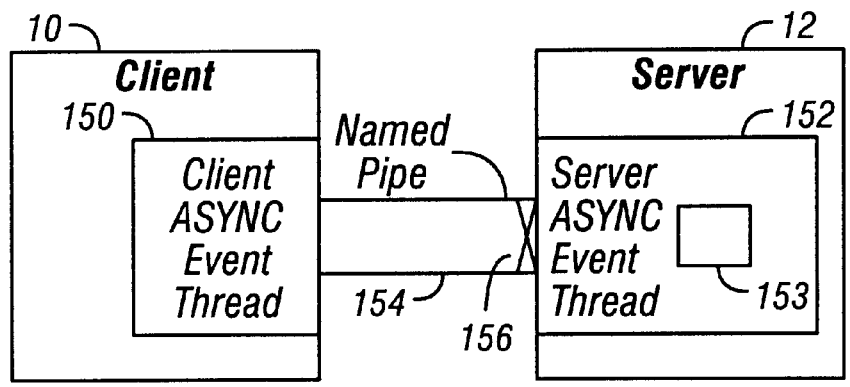
Figure 11E:
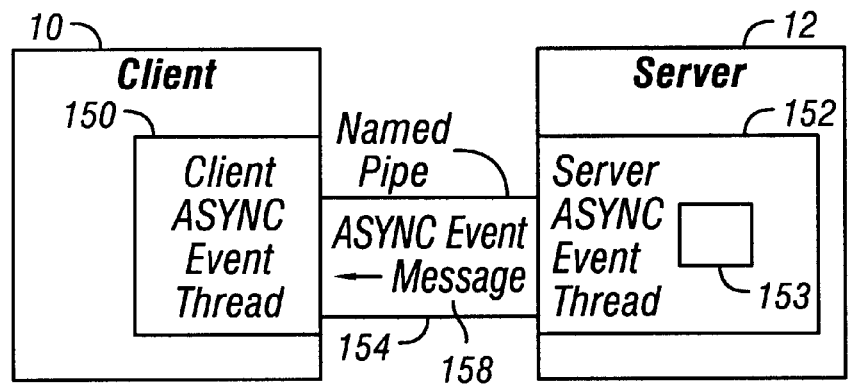
Figure 11F:
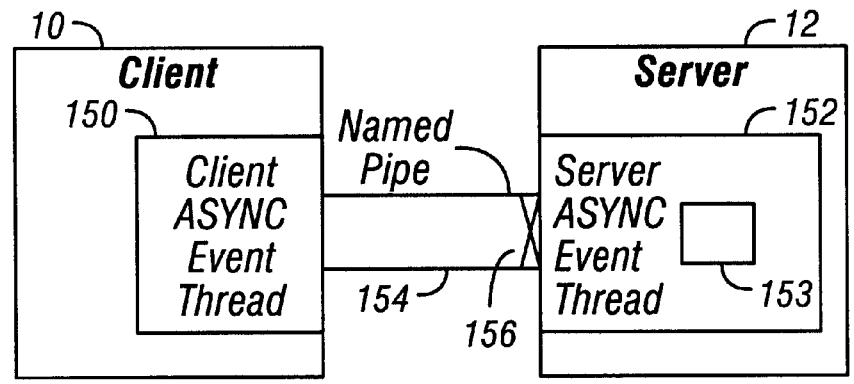
Figure 11G:
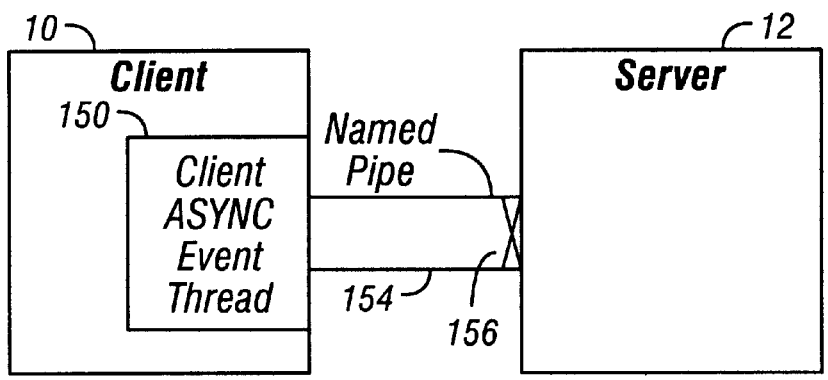
Figure 11H:
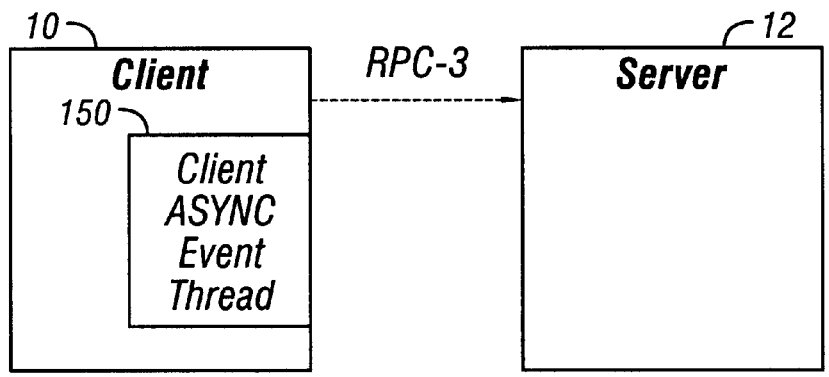
Figure 11I:
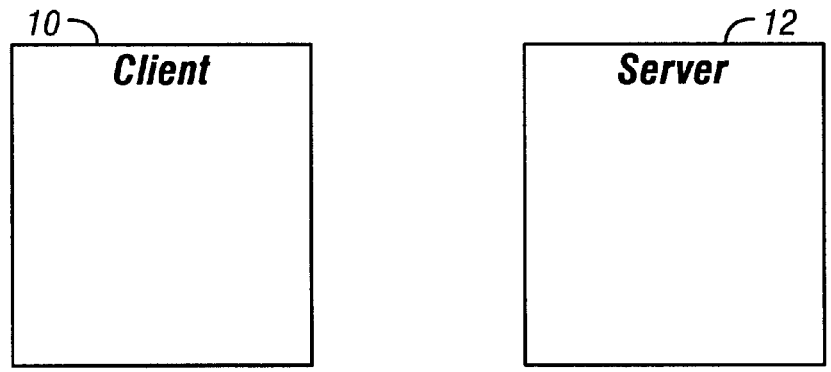

Referring to FIGS. 11A–11I, the asynchronous event messaging process between the client 10 and the server 12 is shown. In the disclosed embodiment, the event messaging process between the client 10 and the server 12 are performed in the order of the stages illustrated by FIGS. 11A–I. It should be understood that the order of the stages may be varied without detracting from the spirit of the invention. Referring to FIG. 11A, remote procedure call, RPC-1, for establishing a client-server connection is shown. Referring to FIG. 11B, a remote procedure call, RPC-2, for creating a named pipe 154 between the client 10 and the server 12 and for creating the server asynchronous event thread 152 is shown. The remote procedure call, RPC-2, also creates the server asynchronous event queue 153 owned by the server asynchronous event thread 152. Referring to FIG. 11C, the client asynchronous event thread 150 for opening the named pipe 154 is shown. Referring to FIG. 11D, the server asynchronous event thread 152 is in a blocked state for blocking execution of the server asynchronous event thread 152. Referring to FIG. 11E, the server asynchronous event thread 152 is shown in an unblocked state. The server asynchronous event thread 152 was placed in an unblocked state in response to an asynchronous event signal 158. The server asynchronous event thread 152 in an unblocked state allows execution of the server asynchronous event thread 152. This way, an asynchronous event may be communicated from the server 12 to the client 10. Referring to FIG. 11F, the server asynchronous event tread 152 is blocked following the asynchronous event message 158 to the client 10. Referring to FIG. 11G, the server asynchronous event thread 152 is terminated. Referring to FIG. 11H, the named pipe 154 is closed by a remote procedure call, RPC-3. Referring to FIG. 11I, the client asynchronous event thread 150 is terminated. Communicating an asynchronous event from a server to a remote procedure client event without the need for polling is of particular use to remote configuring, monitoring and reporting applications for computer systems. Examples of events that may be communicated for such applications include a driver fault event, a temperature fault event, a power fault event, a slot state change event, and a board failure event. It should be understood, however, that any event of interest to a client may be communicated by a server to a client.

Asynchronous Communication Between a Miniport Driver and a Service

Figure 12:
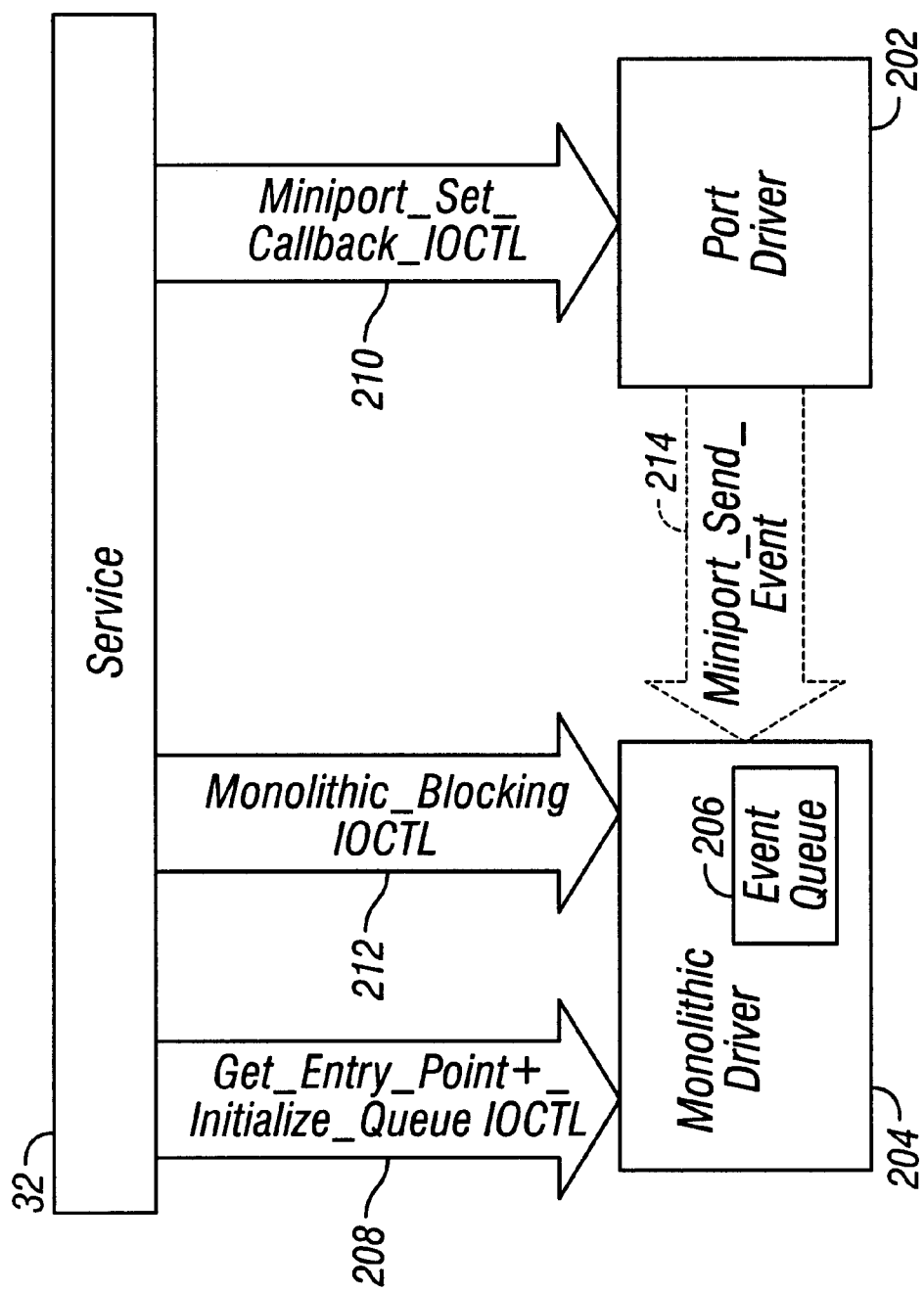
FIG. 12 is a schematic illustration of software components for asynchronous event messaging between a mini-port driver and a service in accordance with the present invention.

Referring to FIG. 12, a schematic illustration of software components within the server 12 for asynchronous event messaging between a mini-port driver 202 and a service 32 in accordance with the present invention is shown. In accordance with the present invention, a monolithic driver 204 is used for communicating an asynchronous event from a mini-port driver 202 to a service 32. The service 32 of the invention supports a GET_ENTRY_POINT_&_INITIALIZE_QUEQUE IOCTL 208 (FIG. 14) to the monolithic driver 204, a MONOLOTHIC_BLOCKING IOCTL 212 (FIG. 16) to the monolithic driver, and a MINIPORT_SET_CALLBACK IOCTL 210 (FIG. 15) to the mini-port driver 202.

For the GET_ENTRY_POINT_&_INITIALIZE_QUEUE_IOCTL 208, the hDevice parameter is the handle of the monolithic driver, and the lpvInBuffer parameter is for storage of the callback address. For the MONOLITHIC_BLOCKING IOCTL 212, the hDevice parameter is the handle of the monolithic driver. For the MONOLITHIC_SET_CALLBACK IOCTL 210, the hDevice parameter is the handle of the mini-port driver 202, and the lpvOutBuffer is the address of a PASS_EVENT routine 248 (FIG. 18) of the event queue 206. It should be understood that each IOCTL defined for the present invention may alternatively be defined as a plurality of IOCTLs and that certain IOCTLS might be merged to define a single IOCTL. It should also be understood that a step or operation of an IOCTL or routine defined for the present invention might itself be implemented in the form of a routine.

A MINIPORT_SEND_EVENT routine 214 (FIGS. 17–18) is provided from the mini-port driver 202 to the monolithic driver 204 for communicating an asynchronous event from the mini-port driver 202 to the monolithic driver 204. The monolithic driver 204 includes the event queue 206 which provides a plurality of slots for storing a plurality of asynchronous events. A mini-port driver is essentially a device specific event-mode driver, and a monolithic driver is essentially a driver containing different classes of functionality. It is contemplated that the monolithic driver 204 may be used (as a dispatch) for communicating asynchronous events between any software component and any driver having an architecture similar to a mini-port driver or between any software component and another monolithic driver. In accordance with the present invention, asynchronous events or asynchronous commands may be sent from the mini-port driver 202 to the service 32. Although a single mini-port driver 202 is illustrated, it should be understood that the server 12 may include a plurality of mini-port drivers 12.

Figure 13:
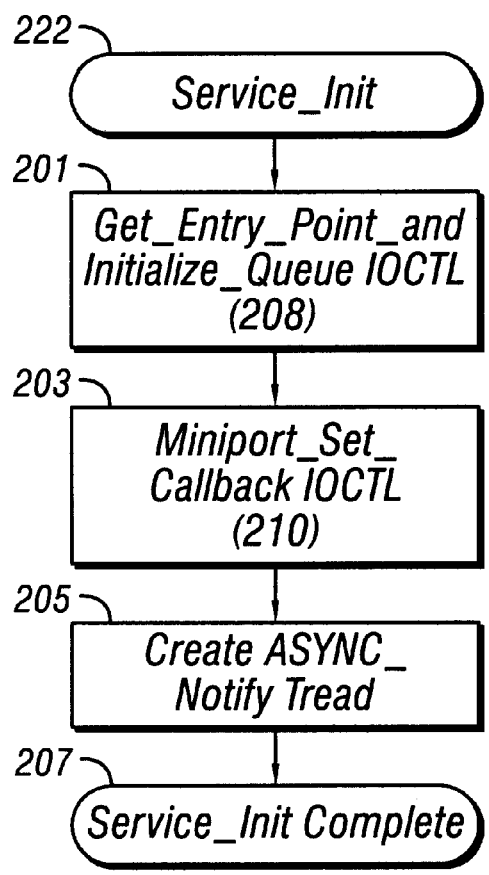
FIG. 13 is a flow chart of a SERVICE_INIT_&_BLOCKING routine for initializing the service of FIG. 12 in accordance with the present invention.
Figure 14:
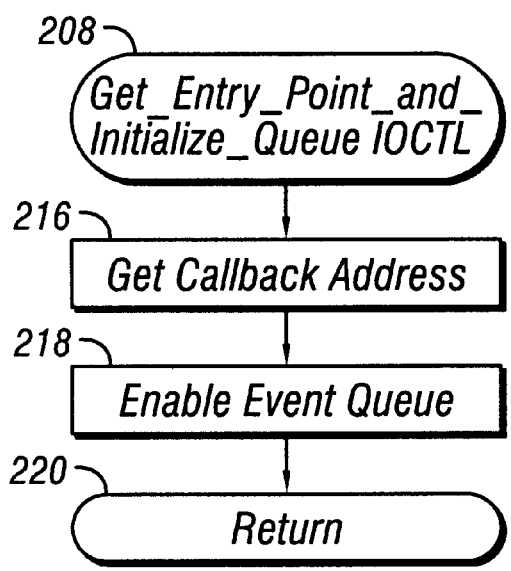
FIG. 14 is a flow chart of a GET_ENTRY_POINT_&_INITIALIZE_QUEUE IOCTL of FIG. 12 in accordance with the present invention.
Figure 15:
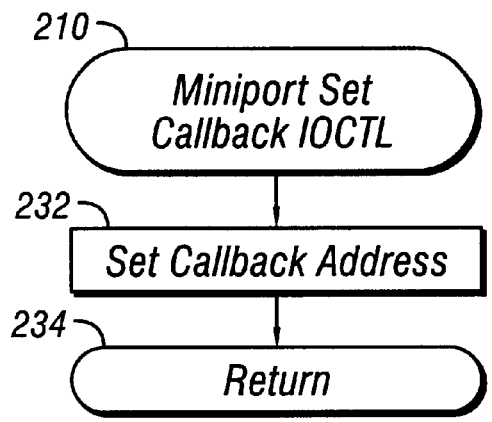
FIG. 15 is a flow chart of a MINIPORT_SET_CALLBACK IOCTL of FIG. 12 in accordance with the present invention.

Referring to FIG. 13, a SERVICE_INIT routine 222 is shown. During initialization of the service 32, control begins at step 201. At step 201, the GET_ENTRY_POINT_&_INITIALIZE_QUEUE IOCTL 208 is called. Referring to FIG. 14, the GET_ENTRY_POINT_&_INITIALIZE_QUEUE IOCTL 208 is shown. Beginning at step 216, a callback or entry point address is fetched from the monolithic driver 204. The callback address may later be used to call the monolithic driver 204 when there is an asynchronous event to report to the service 32. From step 216, control proceeds to step 218 wherein the event queue 206 is enabled. Control next returns through step 220. Returning to FIG. 13, control proceeds from step 201 to step 203. In step 203, the MINIPORT_SET_CALLBACK IOCTL 210 is called. Referring to FIG. 15, the MINIPORT_SET_CALLBACK IOCTL 210 is shown. Beginning at step 232, the callback address is provided to the mini-port driver 202. This is done for each mini-port driver 202 needing to communicate to the service 32. Control then returns through step 234. Referring to FIG. 13, control proceeds to step 205 where an ASYNC_NOTIFY thread 118 (FIG. 9) is created. The ASYNC_NOTIFY thread 118 calls the MONOLITHIC_BLOCKING IOCTL 212 of FIG. 16. From step 205, control proceeds to step 207. It should be understood that initialization of a service may include various process tasks (general and application-specific) which would be appreciated by one of ordinary skill in the art.

Figure 16:
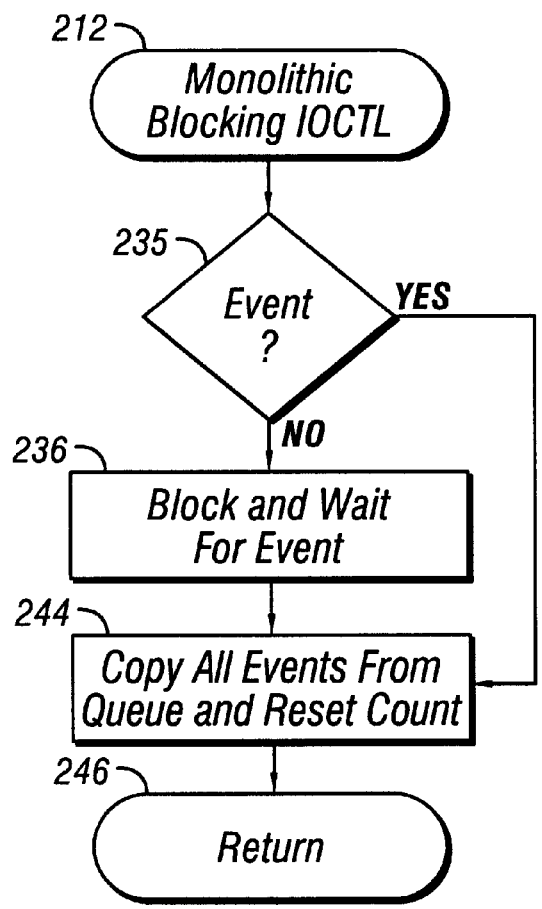
FIG. 16 is a flow chart of a MONOLITHIC_BLOCKING IOCTL of FIG. 12 in accordance with the present invention.

Referring to FIG. 16, the MONOLITHIC_BLOCKING IOCTL 212 begins at step 235 where it is determined if there is an event in the event queue 206. If so, control proceeds to step 244 where all events are copied and a count is reset. The count is used for tracking the number of events held by the event queue 206. If not, control proceeds to step 236 where the ASYNC_NOTIFY thread 118 is blocked. The thread 118 remains blocked until the signal generated in step 254 is received. Once the signal is received, control proceeds to step 244 where all events are copied. From step 244, control returns through step 246. In accordance with the present invention, an event or events may be available before or after the MONOLITHIC_BLOCKING IOCTL 212 is called.

Figure 17:
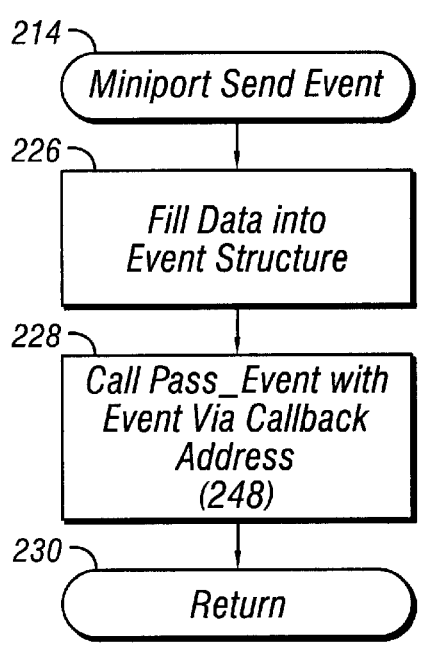
FIG. 17 is a flow chart of a MINIPORT_SEND_EVENT routine of FIG. 12 in accordance with the present invention.
Figure 18:
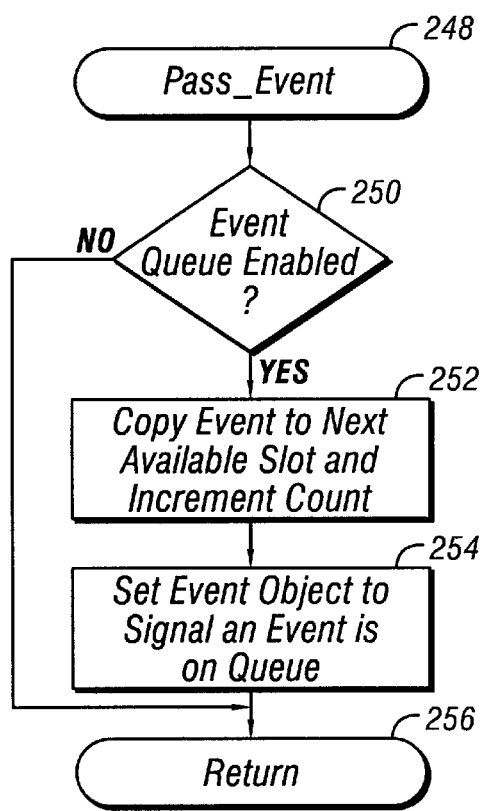
FIG. 18 is a flow chart of a PASS_EVENT routine called by the MINI-PORT_SEND_EVENT routine of FIG. 17.

Referring to FIG. 17, the MINIPORT_SEND_EVENT routine 214 is shown. Beginning at step 226, an event structure of an event object is filled with event data for the detected event. From step 226, control proceeds to step 228 where a PASS_EVENT routine 248 is called with the particular event using the callback address. Referring to FIG. 18, the PASS_EVENT routine 248 is shown. Control begins at step 250 where it is determined if the event queue 206 is enabled. If the event queue 206 is disabled, control returns through step 256. If the event queue 206 is enabled, then control proceeds to step 252. In step 252, the event is copied to the next available slot in the event queue 206 and the count is incremented.

From step 252, control proceeds to step 254 where the event object is set to signal an event is in the event queue 206. The MINIPORT_SEND_EVENT routine 214 may be concurrent with the MONOLITHIC_BLOCKING IOCTL 212. An event may not be detected in step 238 (FIG. 16), until an event object is set in step 254. Setting the event object signals the monolithic driver 204 that an asynchronous event is present. In the disclosed embodiment, a deferred procedure call (DPC) is used to set an event object. While one mini-port driver 202 is accessing the event queue 206, other mini-port drivers 202 are prevented from accessing the event queue 206. Exclusive access to the event queue 206, for example, may be achieved by a mini-port driver 202 acquiring a spinlock object to access the event queue 206. In the disclosed embodiment, each mini-port driver 202 has an ID to use when calling the monolithic driver 204 for identifying which mini-port driver 202 an asynchronous event is coming from. From step 254, control returns through step 256. The disclosed asynchronous messaging process between the mini-port driver 202 and the service 32 may be used as an alternative to polling a mini-port driver 202 or in conjunction with polling a mini-port driver 202. Communicating asynchronous events from a mini-port driver to a software component is of particular use to remote configuring, monitoring, and reporting applications for computer systems.

The foregoing disclosure and description of the invention are illustrative and explanatory thereof, and various changes in the number of variables, number of parameters, order of steps, field sizes, data types, code elements, code size, connections, components, and materials, as well as in the details of the illustrated hardware and software and construction and method of operation may be made without departing from the spirit of the invention.

We claim:

1. A method of communicating asynchronous events from a mini-port driver of a computer system, comprising the steps of:
   calling a monolithic driver by a software component of the computer system to obtain a monolithic driver entry point address;
   calling the mini-port driver by the software component to pass the monolithic driver entry point address to the mini-port driver;
   calling the monolithic driver by the software component to block execution of an asynchronous event notification thread in the monolithic driver; and
   calling the monolithic driver entry point address by the mini-port driver to unblock execution of the asynchronous event notification thread and queue an event if the mini-port driver detects an event.

2. The method of claim 1, further comprising the steps of:
   providing the event from the monolithic driver to the software component through the asynchronous event notification thread.

3. The method of claim 2, further comprising the steps of:
   calling the monolithic driver by the software component to re-block execution of the asynchronous event notification thread after providing the event through the asynchronous event notification thread.

4. The method of claim 2, further comprising the step of:
   processing the event by the software component.

5. The method of claim 1, wherein the software component is a service.

6. The method of claim 1, wherein the computer system comprises a server.

7. The method of claim 6, the computer system including a client, further comprising the step of:
   providing the event to the client in response to the event being provided through the asynchronous event notification thread.

8. The method of claim 7, wherein the client is a remote procedure call client.

9. The method of claim 1, wherein the monolithic driver supports an address call by the software component for obtaining the monolithic driver entry point address.

10. The method of claim 1, wherein the mini-port driver supports a call for passing the monolithic driver entry point address to the mini-port driver.

11. The method of claim 1, wherein the monolithic driver supports a call for blocking execution of the asynchronous event notification thread in the monolithic driver.

12. The method of claim 1, wherein the monolithic driver supports a call by the mini-port driver with the monolithic driver entry point address to unblock execution of the asynchronous event notification thread.

13. The method of claim 1, wherein the monolithic driver comprises an event queue for holding events.

14. The method of claim 1, wherein the steps of calling the monolithic driver to obtain a monolithic driver entry point address and calling the mini-port driver to pass the monolithic driver entry point address to the mini-port driver are performed during initialization of the software component.

15. The method of claim 1, wherein the asynchronous event notification thread is created during initialization of the software component.

16. A server for communicating asynchronous events from a mini-port driver, comprising:
   a software component;
   a plurality of mini-port drivers;
   a monolithic driver for providing asynchronous events from a mini-port driver of the plurality of mini-port drivers to the software component;
   a processor; and
   a medium readable by the processor, storing:
      server code causing the processor to perform the steps of:
         calling the monolithic driver by the software component to obtain a monolithic driver entry point address;
         calling a mini-port driver of the plurality of mini-port drivers by the software component to pass the monolithic driver entry point address to the mini-port driver;
         calling the monolithic driver by the software component to block execution of an asynchronous event notification thread in the monolithic driver; and
         calling the monolithic entry point address by the mini-port driver to unblock execution of the asynchronous event thread and queue the event if the mini-port driver detects an event.

17. The server of claim 16, the server code causing the processor to perform the further step of:
   providing the event from the monolithic driver to the software component through the asynchronous event notification thread.

18. The server of claim 17, the server code causing the processor to perform the further step of:
   calling the monolithic driver by the software component to re-block execution of the asynchronous event notification thread after providing the event through the asynchronous event notification thread.

19. The server of claim 16, wherein the software component is a service.

20. The server of claim 16, the server code causing the processor to perform the further step of:
   providing the event to a client in response to the event being provided through the asynchronous event notification thread.

21. The server of claim 16, wherein the monolithic driver supports an address call by the software component for obtaining the monolithic driver entry point address.

22. The server of claim 16, wherein the mini-port driver supports a call for passing the monolithic driver entry point address to the mini-port driver.

23. The server of claim 16, wherein the monolithic driver supports a call for blocking execution of the asynchronous event notification thread in the monolithic driver.

24. The server of claim 16, wherein the monolithic driver supports a call by a mini-port driver with the monolithic driver entry point address to unblock execution of the asynchronous event notification thread.

25. The server of claim 16, wherein the monolithic driver comprises an event queue for holding events.

26. The server of claim 16, wherein the software component processes the event provided to the software component.

27. The server of claim 16, wherein the steps of calling the monolithic driver to obtain a monolithic driver entry point address, and calling the mini-port driver to pass the monolithic driver entry point address to the mini-port driver, and performed during initialization of the software component.

28. The server of claim 16, wherein the asynchronous event notification thread is created during initialization of the software component.

29. A medium readable by a computer system for communicating asynchronous events from a mini-port driver, the computer system including a software component, a monolithic driver and a plurality of mini-port drivers, the medium storing:
   asynchronous event communication code for causing the computer system to perform the steps of:
      calling the monolithic driver by the software component to obtain a monolithic driver entry point address;
      calling a mini-port driver by the software component to pass the monolithic driver entry point address to the mini-port driver;
      calling the monolithic driver by the software component to block execution of an asynchronous event notification thread in the monolithic driver; and
      calling the monolithic driver entry point address by the mini-port driver to unblock execution of the asynchronous event notification thread and queue the event if the mini-port driver detects an event.

30. The medium of claim 29, the asynchronous event communication code causing the computer system to perform the further step of:
   providing the event from the monolithic driver to the software component through the asynchronous event notification thread.

31. The medium of claim 30, the asynchronous event communication code causing the computer system to perform the further step of:
   calling the monolithic driver of the software component to re-block execution of the asynchronous event notification thread after providing the event through the asynchronous event notification thread.

32. The medium of claim 29, wherein the software component is a service.

33. The medium of claim 29, the asynchronous event communication code causing the computer system to perform the further step of:
   providing the event to a client in response to the event being provided through the asynchronous event thread.

34. The medium of claim 29, wherein the computer system is a server.

35. The medium of claim 29, wherein the software component processes the event provided to the software component.

36. The medium of claim 29, wherein the monolithic driver supports an address call by the software component for obtaining the monolithic driver entry point address.

37. The medium of claim 29, wherein the mini-port driver supports a call for passing the monolithic driver entry point address to the mini-port driver.

38. The medium of claim 29, wherein the monolithic driver supports a call for blocking execution of the asynchronous event thread in the monolithic driver.

39. The medium of claim 29, wherein the monolithic driver supports a call by a mini-port driver with the monolithic driver entry point address to unblock execution of the asynchronous event thread.

40. The medium of claim 29, wherein the monolithic driver comprises an event queue for holding messages.

41. The medium of claim 29, wherein the steps of calling the monolithic driver to obtain a monolithic driver entry point address, and calling the mini-port driver to pass the monolithic driver entry point address to the mini-port driver are performed during initialization of the software component.

42. The medium of claim 29, wherein the asynchronous event notification thread is created during initialization of the software component.

43. The medium of claim 29, wherein the medium comprises a compact disc read only memory.

44. The medium of claim 29, wherein the medium comprises a disk.

45. The medium of claim 29, wherein the medium comprises a memory device.

* * * * *